US005160563A

United States Patent [19]

Kutchmarek et al.

[11] Patent Number: 5,160,563

[45] Date of Patent: Nov. 3, 1992

[54] METHOD AND APPARATUS FOR MAKING AN EXPANDABLE CELLULAR SHADE

[75] Inventors: Darrell J. Kutchmarek, Waunakee; James H. Stauffacher, Middleton, both of Wis.

[73] Assignee: Graber Industries, Inc., Middleton, Wis.

[21] Appl. No.: 502,575

[22] Filed: Mar. 30, 1990

Related U.S. Application Data

[63] Continuation-in-part of Ser. No. 417,725, Oct. 5, 1989.

[51] Int. Cl.[5] .......... B32B 3/28

[52] U.S. Cl. .......... 156/204; 156/474; 156/548; 493/413; 118/221; 118/223; 118/242; 427/286

[58] Field of Search .......... 156/197, 204, 474, 199, 156/548; 493/413, 451; 428/116; 118/221, 223, 225, 241, 242, 255, 256, 313, 315, 325; 427/286

[56] References Cited

U.S. PATENT DOCUMENTS

| | | | |
|---|---|---|---|
| 2,201,356 | 5/1940 | Terrell . | |
| 2,556,011 | 6/1951 | Swayze et al. . | |
| 2,619,444 | 11/1952 | Grantham . | |
| 3,166,456 | 1/1965 | White et al. . | |
| 3,535,190 | 10/1970 | Loomer et al. | 156/548 |
| 3,722,468 | 3/1973 | Middleton | 118/315 |
| 3,770,549 | 11/1973 | Carbone . | |
| 3,963,549 | 6/1976 | Rasmussen . | |
| 4,151,026 | 4/1979 | Hospied | 156/474 |
| 4,288,485 | 9/1981 | Suominen . | |
| 4,346,132 | 8/1982 | Cheng et al. . | |
| 4,347,887 | 9/1982 | Brown . | |
| 4,603,072 | 7/1986 | Colson . | |
| 4,625,786 | 12/1986 | Carter . | |
| 4,631,217 | 12/1986 | Anderson . | |
| 4,677,012 | 6/1987 | Anderson . | |
| 4,812,195 | 3/1989 | Vijuk | 156/204 |
| 4,861,404 | 8/1989 | Neff | 156/204 |
| 5,015,317 | 5/1991 | Corey et al. | 156/199 X |

*Primary Examiner*—Michael W. Ball
*Assistant Examiner*—Francis J. Lorin
*Attorney, Agent, or Firm*—Vernon J. Pillote

[57] ABSTRACT

A method and apparatus for making a pleated expandable and collapsible multi-cell product for window coverings and the like. A web of material is accordion folded widthwise to form a series of web panels united in alternate succession along first and second creased folds disposed at respective first and second sides of the web. Successive panels are advanced in an unfolded condition lengthwise of the web through an adhesive applying zone to an inlet end of a refold stack and adhesive is applied to each web panel, in a band parallel to and spaced from the associated creased fold with a preceding panel. The web panels having adhesive applied thereto are refolded in succession along the associated creased fold with a preceding panel onto the inlet end of the refold stack. The band of adhesive is applied at the second side of the web to each panel that joined along a first creased fold to a preceding web panel and the band of adhesive is applied at the first side of the web to each panel that is joined along a second creased fold to a preceding panel.

37 Claims, 8 Drawing Sheets

*Fig. 4A.*
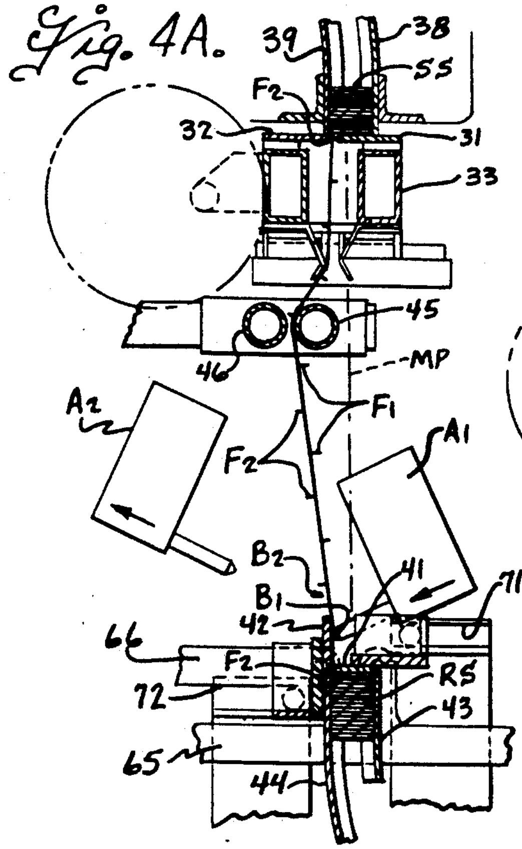
*Fig. 4B.*
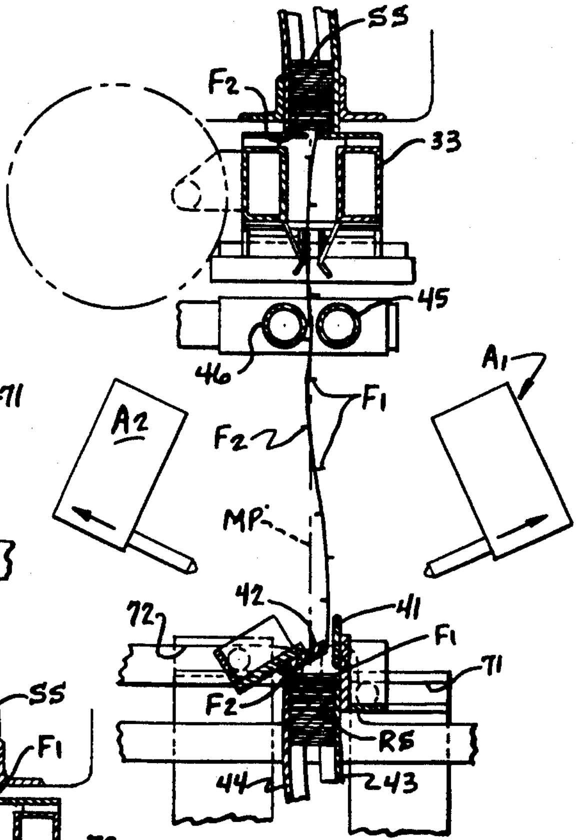
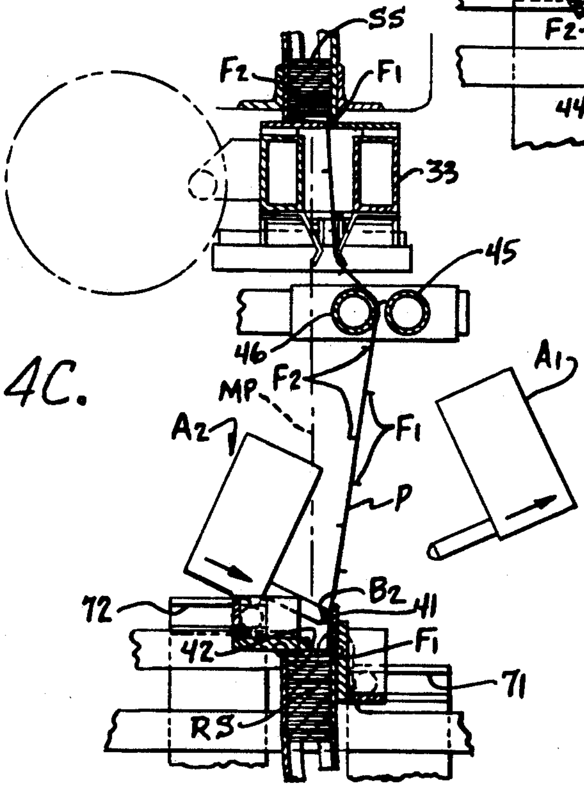
*Fig. 4C.*

METHOD AND APPARATUS FOR MAKING AN EXPANDABLE CELLULAR SHADE

CROSS REFERENCE TO RELATED APPLICATION:

This invention relates to a method and apparatus for making a pleated expandable cellular product for window coverings, and is a continuation-in-part of co-pending application of Kent v. Anderson, Joseph E. Cole, Darrell J. Kutchmarek, Paul A. Schneider and James H. Stauffacher, Ser. No. 07/417,725, filed Oct. 5, 1989, for "Expandable And Collapsible Cellular Shade", assigned to the assignee of the present invention.

BACKGROUND OF THE INVENTION

The prior art discloses various methods and apparatus for forming an expandable cellular product for window coverings and the like. U.S. Pat. Nos. 3,963,549 and 4,603,072, disclose a method of making a cellular structure from a plurality of separate tubes or separate strips that are folded into a tubular configuration, and adhered together, one on top of the other, to form longitudinally extending cells. U.S. Pat. Nos. 4,288,485 and 4,346,132 disclose a method of making a cellular structure from a plurality of sheets that are stacked and adhered together along spaced bands to form a plurality of cells between adjacent sheets. U.S. Pat. Nos. 4,631,217 and 4,677,012 disclose a method of making a cellular structure from a plurality of separate sheets that are longitudinally folded and adhered together such that each sheet forms a part of two adjacent cells. U.S. Pat. Nos. 2,201,356 and 4,625,786 disclose forming a cellular structure from two folded sheets disposed at opposite sides of a shade and connected together at spaced locations. U.S. Pat. No. to Brown 4,347,887 discloses a cellular structure formed from a single continuous sheet of material bonded to itself at spaced intervals to form a plurality of adjacent cells arranged in a double row configuration and such that the double row of cells have generally coplanar outer portions collectively forming a pair of generally parallel outer members and coplanar inner portions collectively forming a common intermediate member spaced between and generally parallel to the outer members.

SUMMARY OF THE INTENTION

The present invention relates to a method and apparatus for making an expandable and collapsible multi-cell product for window coverings or the like and particularly to a method and apparatus for making a pleated multi-cell product for window coverings and the like from a single web of foldable material. The method and apparatus is particularly adapted for making an expandable and collapsible cellular shade of the type disclosed in the aforementioned application of Kent V. Anderson et al, Ser. No. 07/417,725, filed Oct. 5, 1989, and owned by the assignee of the present invention.

In accordance with the present invention, an expandable and collapsible multi-cell is formed by first folding a web of material widthwise alternately in opposite directions along first and second crease folds respectively disposed at first and second sides of the web to form a series of normally flat panels united in alternate succession along respective first and second creased folds. The panels are advanced in succession in an unfolded condition lengthwise of the web and adhesive is applied to the panels at relatively opposite sides of the web, in bands parallel to and spaced from the creased folds, and the panels are then refolded in succession along the creased folds, to adhesively bond adjacent faces of the panels together along a band spaced from the associated creased fold.

The adhesive can be applied to the panels through a single nozzle arranged to travel the entire width of the web. Adhesive can also be applied through a plurality of nozzles that are spaced apart in a direction lengthwise of the band of adhesive, by moving the nozzles in unison lengthwise of the band through a distance at least equal to the spacing between adjacent nozzles. The adhesive band can be applied in alternate succession first to one panel at one side of the web and thereafter to the next succeeding panel at the other side of the web. The adhesive bands can also be applied simultaneously at relatively opposite sides of the web to two adjacent panels, to reduce the overall cycle time.

The panels are fed in succession from an outlet end of a supply stack of folded web panels, in a downward direction and in an unfolded condition through an adhesive applying zone to an upper end of a refold stack, and the panels, after application of adhesive thereto, are refolded in succession along the associated creased fold with a preceding panel onto the upper end of the refold stack. The band of adhesive is applied at a second side of the unfolded web to each panel that is joined along a first creased fold to a preceding panel and the band of adhesive is applied at the first side of the web to each panel that is joined along a second creased fold to a preceding panel.

The feeding of web panels one at a time in succession is advantageously achieved by supporting a supply of prefolded web in a supply stack having a lower end, with the first and second creased folds at first and second sides of generally upright median plane; extending a section of the web from the lower end of the supply stack downwardly in an unfolded condition through a web feed slot between a pair of shuttle blades to the upper end of the refold stack, and moving the shuttle blades crosswise of the median plane at the lower end of the supply stack i.e. displaced from a position offset from one side of the median plane to a position on the other side of the median plane and back to position the web feed slot alternately at first and second sides of the median plane for release of the panels in succession from the supply stack. The unfolded web, intermediate the shuttle and the inlet of the refold stack, is displaced crosswise of the median plane in a manner to increase the tension on the web as the shuttle is moved to the first and to the second sides of the median plane, to aid withdrawal of successive panels from the supply stack.

The panels are refolded onto the inlet end of the refold stack after application of adhesive thereto, by first and second panel folding blades disposed at opposite sides of the inlet end of the refold stack and operated alternately to a fold position extending cross the inlet end of the refold stack. One of the folding blades is preferably arranged to hold one panel on the refold stack while the other folding blade supports one side of the next succeeding panel during application of adhesive thereto. The unfolded web intermediate the shuttle and the refold stack, is preferably tensioned during application of adhesive to the panels.

BRIEF DESCRIPTION OF THE DRAWINGS

FIGS. 4a-4c are fragmentary vertical sectional views illustrating the apparatus for feeding panels, applying adhesive to the panels, and refolding the panels, in different moved positions;

DETAILED DESCRIPTION

Figure 9:
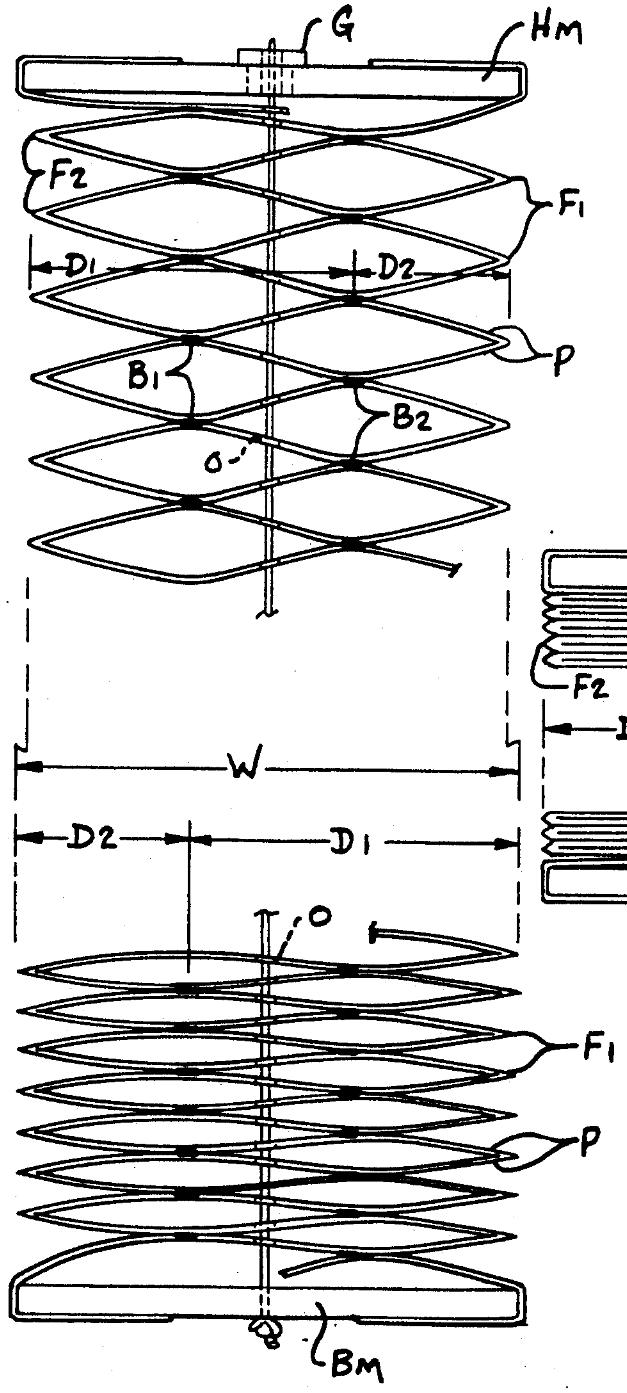
FIG. 9 is an end view of the window covering of FIG. 8 on a larger scale and illustrating the window covering in expanded condition.
Figure 10:
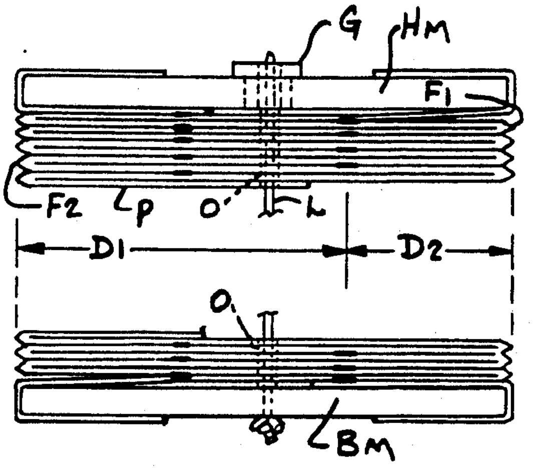
FIG. 10 is an end view of the window covering in a collapsed condition.

The present invention relates to method and apparatus for making an expandable and collapsible multi-cell product for window coverings and the like and particularly to a method and apparatus for making a pleated cellular shade from a single web of material, of the type shown in FIGS. 9-11, and disclosed and claimed in the aforementioned copending application Ser. No. 07/417,725, assigned to the assignee of the present invention.

In general, the expandable and collapsible multi-cell product designated generally by the letter S is formed of a single web of foldable material that is folded alternately in opposite directions along sharp permanently set first and second creased folds designated F1 and F2 disposed at opposite sides of the web such as to form a series of normally flat panels P that are serially united in alternately succession along respective first and second creased folds. The creased folds F1 and F2 are parallel to each other and are spaced apart a uniform preselected distance such that the panels P have the same transverse width designated W in FIG. 9 between the associated first and second creased folds F1 and F2. The web can be formed of various different materials which are foldable and adapted to retain permanently set creased folds. The web may, for example, be formed of suitable plastic film such as polyester film, or from woven and non-woven material formed from various fibers including natural and synthetic, such as a polyester that retains a crease when folded in the presence of heat. Each pair of panels that are united along a first creased fold F1 have adjacent faces bonded together along a narrow first adhesive band designated B1 that is parallel to and spaced a predetermined distance designated D1 in FIGS. 9 and 10 from the associated first creased fold F1, and the pairs of panels that are united along each of the second creased folds F2 have adjacent faces bonded together along a narrow second band B2 that is parallel to and spaced the same distance D1 from the associated second creased fold, where D1 is greater than one-half the width W and less than the full width of the panels. The distance D1 is preferably selected so as to be about two-thirds the width of the panels so that the distance D2 in FIGS. 9 and 10 between the bands B1 and the fold lines F2 and the similar distance D2 between the bands B2 and the fold lines F1 is about one-third the width of the panels. Stated otherwise, the first and second bands B1 and B2 are respectively spaced from the second and first creased folds F2 and F1 a distance substantially equal to the spacing between the first and second bands B1 and B2. Bands B1 and B2 are formed of a suitable adhesive such as a hot melt adhesive, and are preferably made relatively narrow, for example, of the order of one-eighth inch or less.

Figure 8:
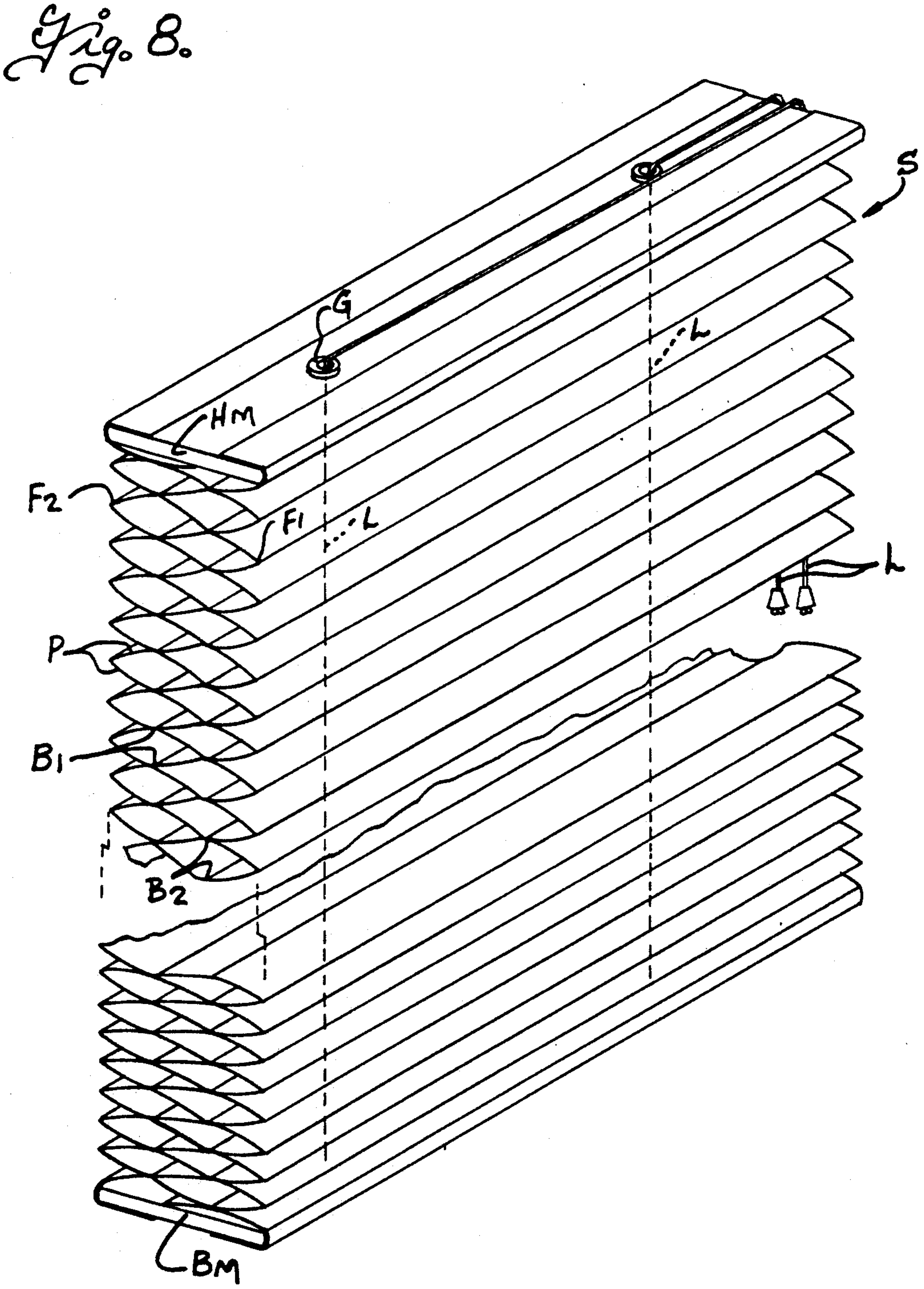
FIG. 8 is a perspective view of a window covering formed from the expandable and collapsible multi-cell product of the present invention.

The method and apparatus is adapted to make expandable and collapsible multi-cell product in relatively wide widths for example of the order of eight feet or more, and in any desired length. The multi-cell product can be easily cut to make window coverings of the desired size, and means such as end members designated HM and BM in FIGS. 8-10 are attached or connected to the ends of the window covering to adapt the same for mounting in a window opening. A means such as lift cords L are attached to one of the end members such as the bottom member BM and extend through openings 0 punched or otherwise formed in the window covering, and over guides G on the head member to facilitate opening and closing of the window covering.

Figure 1:
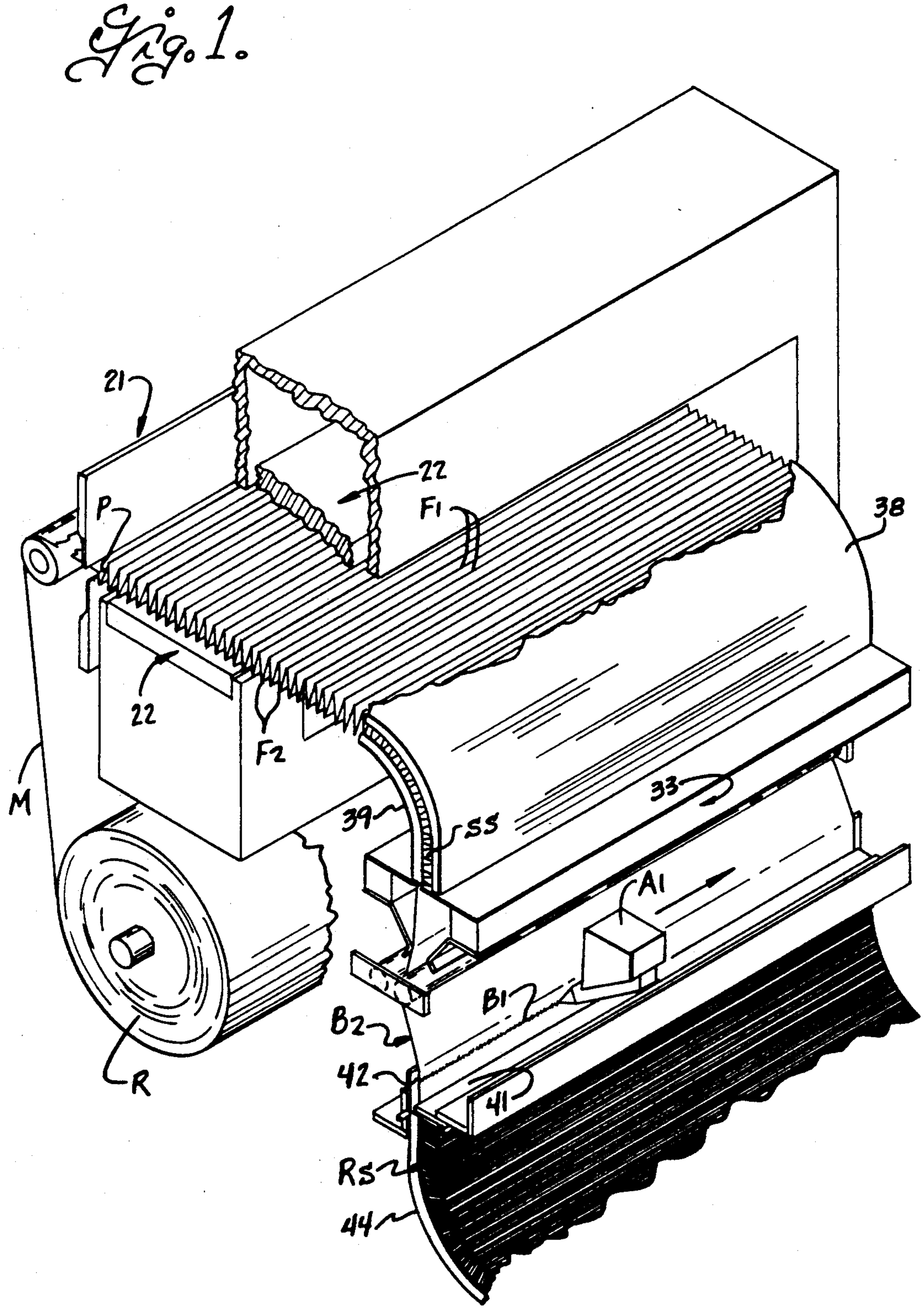
FIG. 1 is a diagrammatic view of illustrating an apparatus for carrying out a method according to the present invention.

FIG. 1 is a schematic view of an apparatus for performing the method of the present invention. As shown, a web of material M from a web supply such as a roll R is first pleated in a pleater indicated by the numeral 21 which folds the web of material widthwise alternately in opposite directions along first and second creased folds respectively disposed at first and second sides of the web to form a series of normally flat panels P of uniform width and united in alternate succession along respective first and second creased folds F1 and F2. The creased folds are set, as by heating, before and/or after folding. As schematically shown in FIG. 1, the folded web is passed through a crease setting apparatus 22 which heats the folded web and the heated web, while still in a folded condition, is thereafter cooled as by contact with the atmosphere or by cooling platens (not shown) to allow the creased folds to set. Apparatus for accordion folding a web of material to form and set creased folds in the web are known and detailed description of the web folding and creasing apparatus is deemed unnecessary.

In accordance with the present invention, panels of the accordion folded web, either fed directly from a web folding and creasing apparatus or supplied from a remote web folding and creasing apparatus, are advanced in succession in an unfolded condition lengthwise of the web, and adhesive is applied to the unfolded panels at relatively opposite sides of the web, in bands parallel to and spaced from the creased folds, and the panels are then refolded in succession along the creased folds, to adhesively bond adjacent faces of the panels together along a band spaced from the associated creased fold. As schematically shown in FIG. 1, a quantity of prefolded web is supported in a supply stack SS with adjacent panels in sidewise abutting relation and panels from the supply stack are unfolded in succession and advanced in an unfolded condition through a bonding zone BZ to the upper end of a refold stack RS. The creased folds in the unfolded web section are schematically illustrated as short projections designated F1 and F2 at the right and left sides of the web in FIGS. 4a-4c. Adhesive is applied in the bonding zone to each web panel in a band parallel to and spaced from the associated creased fold with a preceding panel, and the web panels having adhesive applied thereto are refolded in succession along the associated creased fold with a preceding panel onto the inlet end of the refold stack. The adhesive is applied at the second side of the web to each panel that is joined along a first creased fold F1 to a preceding web panel, and the band of adhesive is applied at the first side of the web to each panel that is joined along a second creased fold F2 to a preceding panel. Upon refolding of the panels with adhesive applied thereto onto the refold stack, adjacent faces of the panels are bonded together along the adhesive bands. Each adhesive band is spaced from the associated creased fold with a preceding panel a distance greater than one-half the width of the panel and preferably about two-thirds the width of the panel so that, when the cellular structure is thereafter expanded, the sidewise adjacent panels that are united along the first creased folds F1 and bonded together along the first bands B1 define a first row of cells C1 therebetween and the sidewise adjacent panels that are united along the second creased folds F2 and bonded together along the second bands B2, define a second row of cells C2 therebetween, with the first and second rows of cells C1 and C2 overlapping in the area between the bands B1 and B2, as shown in FIGS. 8, 9 and 10.

The panels of the folded web are fed from the supply stack SS in timed relation with the refolding of the panel onto the refold stack RS. The lower end of the supply stack SS is guided between first and second guides 38 and 39, with the first and second creased folds F1 and F2 at first and second sides, respectively the right and left sides as viewed in FIGS. 4a-4c, of a generally upright median plane designated MP. The lower end of the supply stack is supported on shuttle blades 31 and 32 of a shuttle 33 and the blades 31 and 32 are spaced apart to define a web feed slot therebetween. A section of the web from the lower end of the supply stack is extended downwardly in an unfolded condition through the web feed slot and the shuttle 33 is reciprocated crosswise of the median plane at the lower end of the supply stack to move the feed slot alternately between a position at the first side of the median plane as shown in FIG. 4c and a position at the second side of the median plane as shown in FIG. 4a.

The upper end of the refold stack RS is guided between first and second guides 43 and 44 respectively disposed at the first and second sides of the median plane MP, and the panels with adhesive applied thereto are refolded in succession onto the upper end of the refold stack by first and second panel folding blades 41 and 42 respectively disposed at the first and second sides of the median plane. The panel folding blades are each movable between a first position extending upwardly from the one side of the refold stack and a second position extending across the upper end of the refold stack, and the blades 41 and 42 are operated alternately to position one blade in its first position while the other blade is in its second position and vice versa. More specifically, the blades 41 and 42 are operated in timed relation with the shuttle to position the first blade 41 in its second position extending across the inlet end of the refold stack and the second blade 42 in its first position extending upwardly at the second side of the refold stack, when the shuttle is moved to position the web feed slot at the second side of the median plane as shown in FIG. 4a. Similarly, when the shuttle is moved to position the web feed slot at the first side of the median plane, the second blade 42 is moved to a position extending across the upper end of the refold stack and the first folding blade 41 is moved to a position extending upwardly from the first side of the refold stack, as shown in FIG. 4c.

The unfolded web section intermediate the shuttle blades and the inlet end of the refold stack is displaced to the first side of the median plane when the shuttle blades are moved to position the web feed slot at the first side of the median plane as shown in FIG. 4c, to increase tension in the unfolded section of the web and aid in withdrawing the edge of each lowermost panel in the supply stack that is joined along a creased fold F1 with a succeeding panel. Similarly, when the shuttle blades are moved to position the web feed slot at the second side of the web, the unfolded section of the web is displaced to the second side of the median plane, to increase tension the unfolded section of the web and aid in withdrawing the edge of each lowermost panel that is joined along a second creased fold F2 to a succeeding panel. The unfolded section of the web is displaced crosswise of the median plane by first and second web engaging members 45 and 46 that extend generally horizontally and parallel to the median plane respectively at the first and second sides of the web, and the web engaging members are moved horizontally crosswise of the median plane in the manner more fully described hereinafter in timed relation with the movement of the shuttle and to positions spaced relatively greater distances from the median plane than the web feed slot, between a position at the second side of the median plane when the web feed slot in the shuttle is positioned at the second side of the median plane as shown in FIG. 4a to a position at the first side of the median plane when the web feed slot is at the first side of the median plane, as shown in FIG. 4c. As the web engaging member 45 and 46 move from a position shown in FIG. 4a at the second side of the median plane toward a position at the other side of the median plane, the tension in the unfolded web section is relieved as shown in FIG. 4c and the panel folding blade 42 at the second side of the web is moved from its first position toward its second position extending across the inlet end of the refold stack, to refold a panel joined along a second fold line F2 onto the upper end of the refold stack. Similarly, when the web engaging members 45 and 46 are moved from the position shown in FIG. 4c at the first side of the median plane toward the median plane, the tension in the web is again reduced and the other panel folding blade 41 is moved from its first to its second position to refold a panel joined along a first fold line F1 onto the upper end of the refold stack.

Adhesive is applied in the panel bonding zone BZ at first and second sides of the web by adhesive applicators A1 and A2. The adhesive applicators are arranged to apply the adhesive bands B1 and B2 to respective ones of the panels at relatively opposite sides of the web, and in bands parallel to and spaced from the associated creased folds. The band of adhesive is applied at the first side of the web to each panel that is joined along a second creased fold F2 to a preceding panel, and the band of adhesive is applied at the second side of the web to each panel that is joined along a first creased fold F1 to a preceding panel. In accordance with one embodiment of the method, the band of adhesive is applied to each panel when it is contiguous to the inlet end of the refold stack and the panel with adhesive applied thereto is then refolded onto the inlet end of the refold stack. As shown in FIG. 4*a*, a band of adhesive B1 is applied at the first side of the web to a panel joined along a fold line F2 to a preceding panel on the inlet end of the stack, while the blade 42 dwells in its first position engaging that panel at the second side of the web, and that panel is then folded onto the inlet end of the refold stack as shown in FIG. 4*c*. A band of adhesive B2 is thereafter applied to a succeeding panel joined along a creased fold F1 to a preceding panel on the inlet end of the stack, while the blade 41 dwells in its first position engaging that panel at the first side of the web, and the succeeding panel thereafter refolded onto the inlet end of the stack. The panel folding blades 41 and 42 are operative alternately and such that one folding blade 41 holds a panel on the inlet end of the refold stack during application of the adhesive band B1 and, similarly, the other panel folding blade 42 holds a panel on the end of the inlet stack during application of adhesive band B2.

The bands B1 and B2 of adhesive can each be applied by a single nozzle N1 as schematically shown in FIG. 1 mounted on an adhesive applying head at Hl that is movable horizontally along the face of the web through a distance at least equal to the desired length of the adhesive band. In order to reduce the overall cycle time, each of the bands B1 and B2 of adhesive can be applied by a plurality of nozzles designated PN1 in FIG. 5 mounted on a header Hl' that is supported for reciprocation in a direction lengthwise of the band of adhesive and moved through a distance lengthwise of the band at least equal to the spacing of the nozzles along the header. As will be understood, dispensing of the adhesive through the nozzles is controlled by valves (not shown) that are operated in timed relation with the movement of the nozzles, for example as by electric solenoids or by pneumatic actuators.

Figure 6:
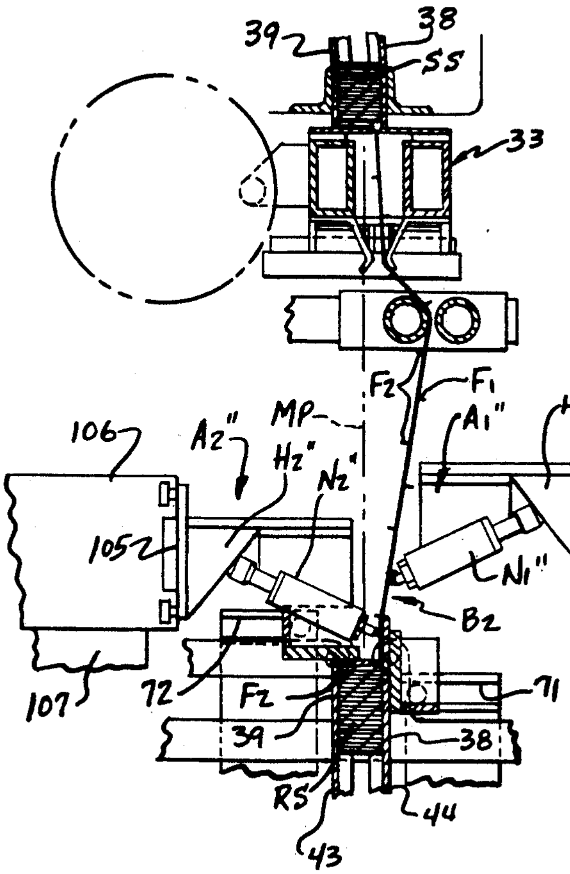
FIG. 6 is a fragmentary vertical sectional view through a modified form of apparatus for feeding panels from a stack, applying adhesive to the panels, and refolding the panels.
Figure 7:
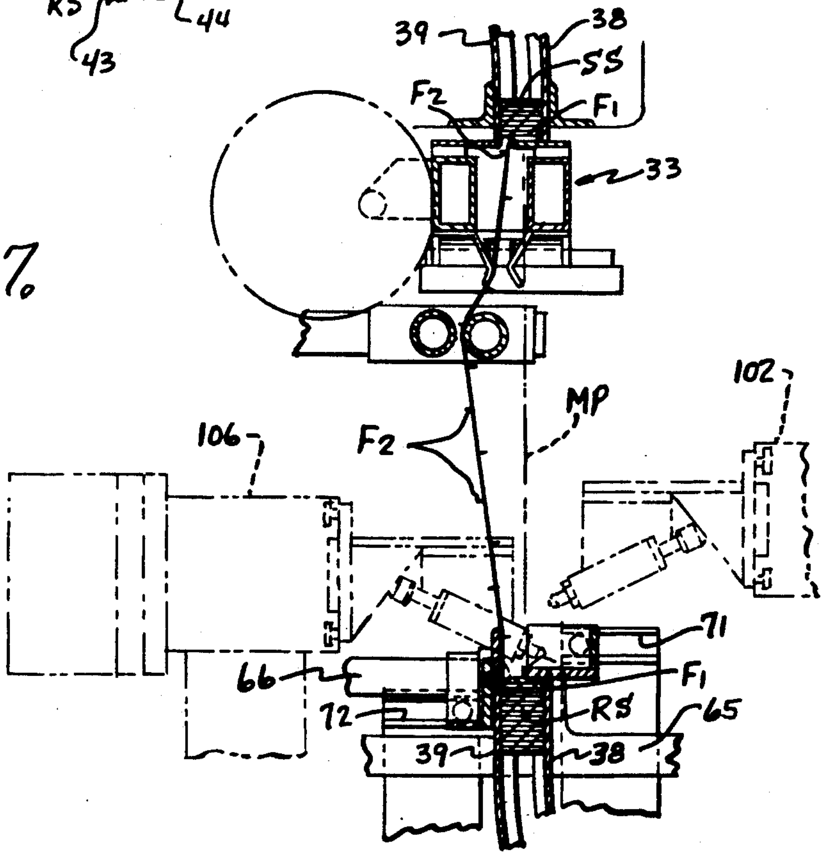
FIG. 7 is a fragmentary vertical sectional view through the apparatus of FIG. 7, illustrating parts in a different moved position.

The overall cycle time can also be reduced by applying adhesive simultaneously at relatively opposite sides of the web to two adjacent panels, and then refolding the two panels in succession onto the inlet end of the stack prior to application of adhesive to a succeeding pair of panels. Thus, as diagrammatically shown in FIGS. 6 and 7, one adhesive applicator A2" has a nozzle N2" arranged to apply a band of adhesive B2 at the second side of the web to a panel joined along a creased fold F1 to a preceding panel on the inlet end of the refold stack, and a second adhesive applicator A1" as a nozzle N1" arranged to apply a band of adhesive B1 to the next succeeding panel that is joined along a creased fold F2 to the preceding panel. The bands of adhesive B1 and B2 are applied simultaneously to the two adjacent by moving the nozzles in unison in one direction widthwise of the web while the panel folding blades are dwelling in the position shown in FIG. 6 with one blade 42 holding a panel on the end of the refold stack RS and the other blade 41 supportably engaging the first side of the web. The two panels with adhesive applied thereto are then refolded in succession onto the inlet end of the stack and the nozzles thereafter moved in a direction opposite the first mentioned direction to apply adhesive to two succeeding panels. Thus, the feeding of panels in succession from the supply stack and the refolding of the panels in succession onto the inlet end of the refold stack, and the tensioning of the web in the embodiment of FIG. 6 and 7 is the same as that previously described. However, adhesive is applied simultaneously to two adjacent panels rather than alternately as in the preceding embodiment.

The apparatus for feeding web panels in succession from the supply stack and refolding successive panels onto the refold stack and tensioning the web intermediate the supply stack and refold stack is the same in the several embodiments and like numerals are used to designate corresponding parts. The apparatus has a rigid frame structure including side members 61 and 62 and the supply stack guides 38 and 39 are mounted on the rigid frame structure. The shuttle 33 is supported on guides 64 or reciprocation along a generally horizontal path crosswise of the median plane at the lower end of the supply stack guides and the shuttle is reciprocated in any suitable manner as by cam follower 33*a* driven by a cam mounted on a cam shaft 70 (FIGS. 2 and 3).

Figure 2:
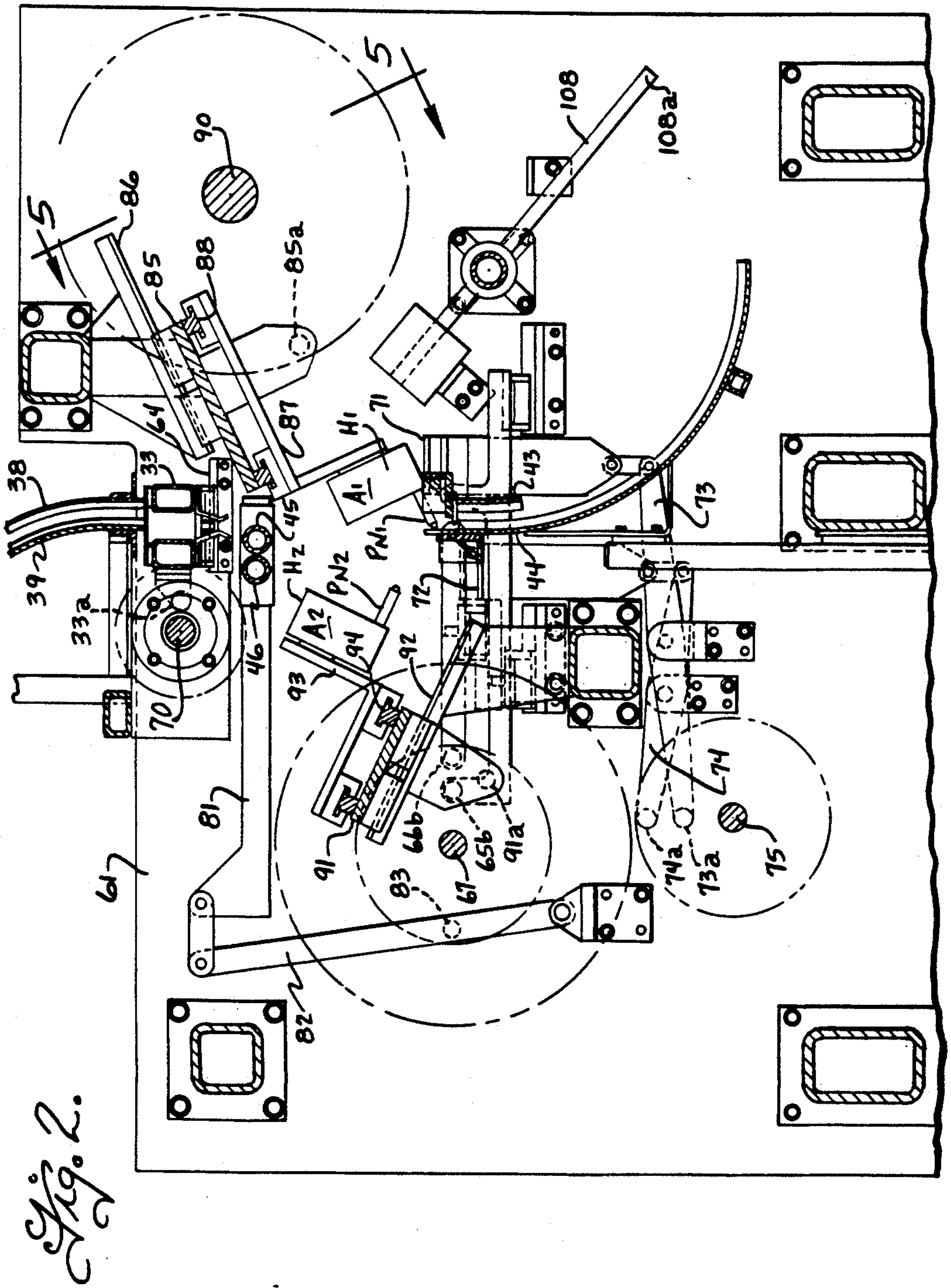
FIG. 2 is a vertical sectional view through an apparatus for feeding panels from a stack of folded panels; applying adhesive to the panels, and refolding the panels onto a refold stack.
Figure 3:
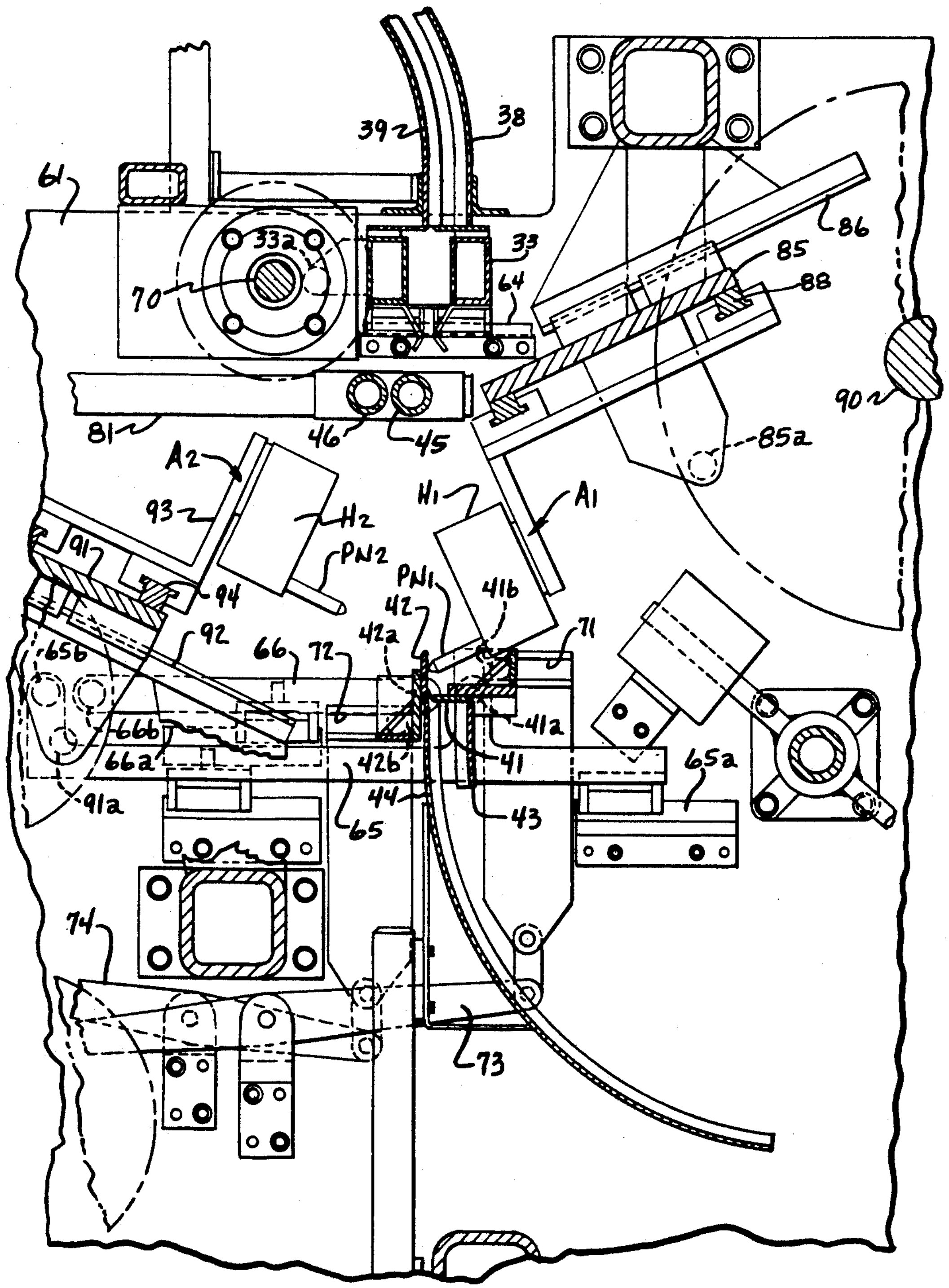
FIG. 3 is a fragmentary vertical sectional view shown in part of FIG. 2 on a larger scale.

As best shown in FIG. 3, the folding blade 41 is pivotally supported at 41*a* on a member 65 and folding blade 42 is pivotally supported at 42*a* on a member 66. In order to provide clearance between the folding blades and the web during raising of the blades, the members 65 are supported on guides 65*a* and 66*a* for limited horizontal movement in a direction toward and away form the median plane at the inlet end of the stack of refolded panels. The members 65 and 66 are reciprocated in timed relation with each other in a manner more specifically described hereinafter as by cam followers 65*b* and 66*b* driven from a suitable cam or cams on a cam shaft 67. Folding blade 41 has a crank pin 41*b* offset from the pivot 41*a* and engaged in a guide 71, and blade 42 has a crank pin 42*b* offset from the pivot 42*a* and engaged in a guide 72. The guides 71 and 72 are reciprocated vertically through levers 73 and 74 respectively and, as shown in FIG. 2, the levers have followers 73*a* and 74*a* respectively that engage suitable cams driven from a cam shaft 75. The cam shafts 70 and 75 are driven in timed relation with each other and with cam shaft 67, to move the panel folding blades alternately from an upright position to a panel fold position. More specifically, the cams on shaft 67 are arranged to shift the folding blade pivots horizontally in a direction away from the median plane during movement of each folding blade from its fold position to an upright position, to prevent contact with the adhesive applied to the web.

The web engaging members 45 and 46 are supported on a member 81 for horizontal movement in a direction crosswise of the median plane and, as shown in FIG. 2, the member 81 is reciprocated in timed relation with the shuttle and folding blade by a lever 82 having a follower 83 driven by a suitable cam on the cam shaft 67. The cam and lever 82 are arranged to shift the web engaging members 45 and 46 horizontally in the same direction as the horizontal movement of the shuttle 33, but through a somewhat greater distance than the movement of the shuttle, to displace the web intermediate the shuttle and the refold stack in a manner to increase tension in the unfolded portion of the web when the shuttle is moved to a position at either the first or the second side of the median plane, and to release the tension in the portion of the web between the shuttle and the refold stack, when the members are disposed adjacent the median plane.

Figure 5:
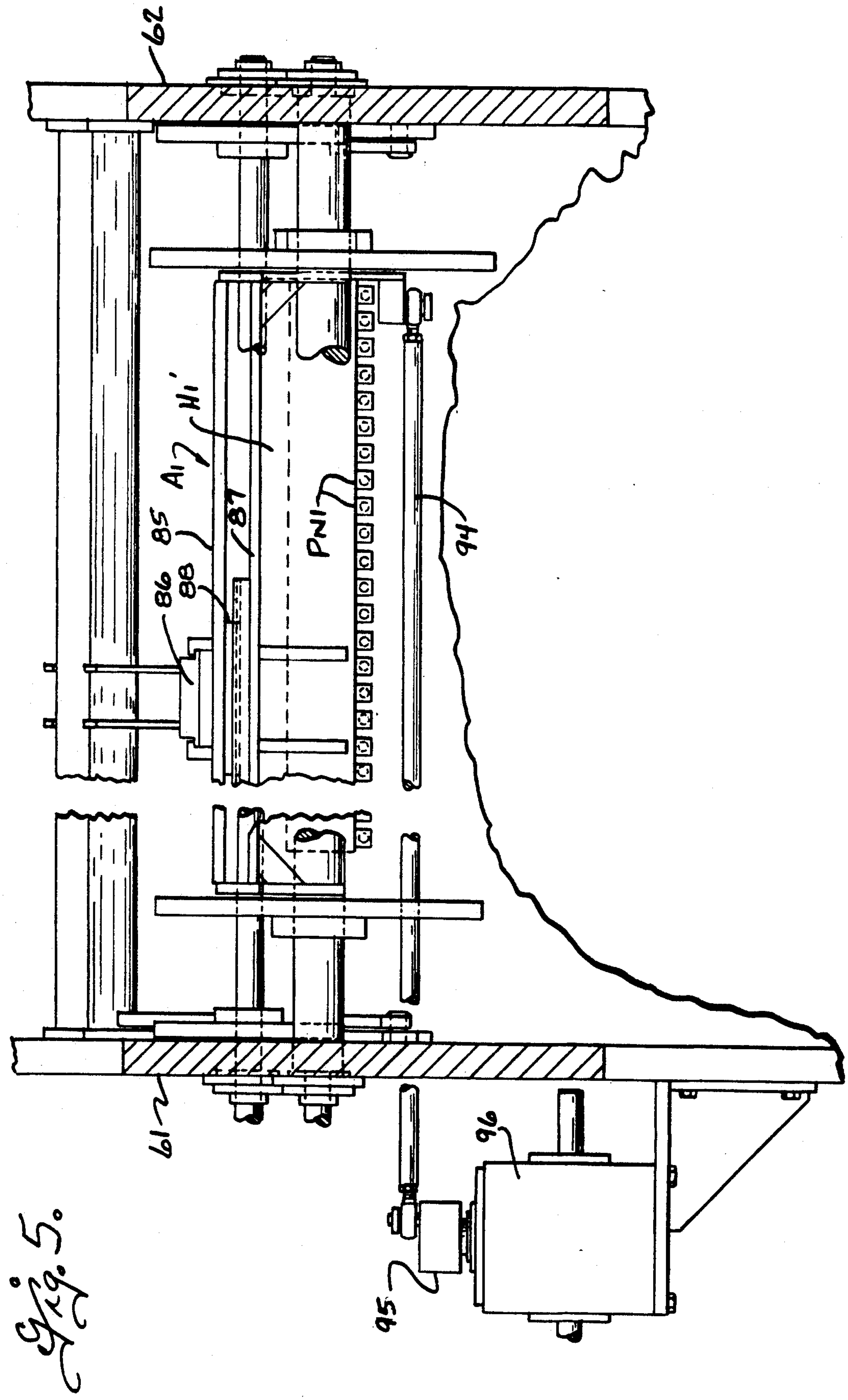
FIG. 5 is a fragmentary transverse sectional view taken on the plane 5—5 of FIG. 2.

In the embodiment of FIGS. 2–5, the adhesive applicators A1 and A2 are mounted for movement forward and away from the median plane into and out of a position for applying adhesive to a web, and are also mounted for movement horizontally in a direction paralleling the median plane during application of adhesive to the web. As best shown in FIGS. 2, 3 and 5, a member 85 is supported on guides 86 that are fixed to the frame structure, for movement in a direction toward and away from the median plane, and the adhesive applicator A1 is mounted by brackets 87 that are supported on guides 88 for horizontal movement in a direction paralleling the median plane. Similarly, a member 91 is supported on guides 92 fixed to the frame structure, for movement in a direction toward and away from the median plane, and the adhesive applicator A2 is supported by brackets 93 on guides 94 for movement horizontally in a direction paralleling the median plane. Member 85 has a cam follower 85*a* operated by a suitable cam on a cam shaft 90, to move the member 85 and hence the adhesive applicator A1 in a direction toward and away the median plane, and member 91 has a cam follower 91*a* engageable with a suitable cam on the cam shaft 67, to move the member 91 and hence the adhesive applicator A2 toward and away from the median plane. Cam shaft 90 is operated in timed relation with cam shaft 67 and with cam shaft 75, to shift the adhesive applicator A1 to its adhesive applying position as shown in FIG. 4*a* and retract the adhesive applicator A2, when the panel folding blade F2 is in its first position, and to move the adhesive applicator A2 into its adhesive applying position while retracting the applicator A1, when the panel folding blade 41 is at its first position as shown in FIG. 4*c*.

As shown in FIG. 5, the adhesive applicator A1 comprises a plurality of nozzles designated PN1 mounted at uniformly spaced locations along a header Hl'. The header is connected through a link 94 to a crank 95 driven by an indexer 96. The indexer is operated in timed relation with the operation of the folding blades, and while the folding blades are dwelling, to reciprocate the header in one direction when the adhesive applicator A1 is in its adhesive applying position shown in FIG. 2, through a distance at least equal to the spacing of the nozzles along the header Hl. Valves (not shown) are operated in timed relation with the reciprocation of the header, to dispense adhesive through the nozzles, The other adhesive applicator A2 similarly comprises a header H2 having a plurality of nozzles PN2, and reciprocated through a crank drive and indexer (not shown).

In the embodiment of FIGS. 6 and 7, the adhesive applicator A1" comprises a single dispensing nozzle N1" connected to a glue dispensing head Hl" that is supported on a slide 101 guidably mounted on a rail 102 for movement along a first horizontal path paralleling the median plane at one side of the web. The slide 101 is driven along the rail as by a drive such as a belt located in the rail and driven by a motor drive such as a servo motor 103. The adhesive dispenser A2' similarly includes a single nozzle N2" connected to a head H2" mounted by a slide 105 on a crossrail 106 for movement along a second horizontal path paralleling the median plane at the other side of the web. The slide 105 is driven along the rail by a drive such as a belt located in the rail and driven by a motor such as a servo motor 107.

In the embodiment of FIGS. 6 and 7, the nozzles N1" and N2" are vertically offset to engage the web at vertically spaced locations to simultaneously apply adhesive to two adjacent panels. Since the paths of movement of the nozzles do not overlap, it is not necessary to shift the nozzles toward and away from the median plane. Instead, the nozzles are moved along respective paths somewhat greater than the width of the web, and are stopped at a position outwardly of the web during refolding of the successive panel onto the inlet end of the stack, as shown in FIG. 7. The nozzles are preferably driven and valved in such a manner as to apply adhesive to a pair of adjacent panels, when the nozzles are moved in one direction widthwise of the unfolded web, and to apply adhesive to a succeeding pair off panels when they are moved in the opposite direction widthwise of the web.

At start-up of a new refold stack, stack support levers 108 are moved to a stack support position in which the ends 108*a* of the levers engage and yieldably support the underside of the refold stack during refolding of the panels at the inlet end of the refold stack. After a quantity of refolded panels have accumulated in the refold stack, the frictional drag of the refolded panels on the guides 43, 44 is sufficient to support the refold stack and the levers are moved either manually or automatically to their inoperative position shown in FIGS. 2 and 3.

From the foregoing it is believed that the method and apparatus for making an expandable and collapsible multicell product for window covering from a single web of material will be readily understood. The web is prefolded to form a series of normally flat panels united in alternate succession along respective first and second creased folds and successive panels are advanced in an unfolded condition lengthwise of the web to a panel bonding zone. Adhesive is applied to each of the unfolded panels, in a band parallel to and spaced from the creased folds, and the panels are thereafter refolded in succession onto a refold stack. The application of adhesive to the panels is correlated with the advance of the unfolded panels and the refolding of the panels onto the refold stack such that the adhesive bands are accurately located parallel to and spaced from the associated creased fold.

The embodiments of the invention in which an exclusive property or privilege is claimed are defined as follows:

1. A process of making a pleated expandable and collapsible multi-cell product for window coverings and the like comprising, providing a web of material accordion folded widthwise and having a series of web panels united in alternate succession along first and second creased folds disposed at respective first and second sides of the web, unfolding and advancing successive panels in an unfolded condition lengthwise of the web through an adhesive applying zone to an inlet end of a refold stack, applying adhesive in the adhesive applying zone to each web panel, in a band parallel to and spaced from the associated creased fold with a preceding panel, and refolding the web panels having adhesive applied thereto in succession along the associated creased fold with a preceding panel onto the inlet end of the refold stack, the band of adhesive being applied at the second side of the web to each panel that is joined along a first creased fold to a preceding web panel and the band of adhesive being applied at the first side of the web to each panel that is joined along a second creased fold to a preceding panel.

2. The process of claim 1 wherein adhesive is applied to a panel contiguous to the inlet end of the refold stack and that panel is then refolded onto the inlet end of the refold stack.

3. The process of claim 1 wherein adhesive is applied to a panel contiguous to the inlet end of the stack and to a next succeeding panel and those two panels are then refolded in succession onto the inlet end of the refold stack.

4. The process of claim 1 including applying each adhesive band through a plurality of nozzles spaced apart in a direction lengthwise of the band, and moving the nozzles lengthwise of the band through a distance less than the length of the band.

5. The process of claim 1 including applying each adhesive band through a single nozzle, and moving the nozzles through the length of the band.

6. The process of claim 1 wherein the panels are advanced in a downward direction to the inlet end of the refold stack.

7. The process of claim 1 including supporting a supply stack of folded web panels and feeding web panels from the supply stack one at a time in timed relation with refolding the web panels onto the inlet end of the refold stack.

8. A process for making a pleated expandable and collapsible multi-cell product for window coverings or the like which comprises, folding a web of material widthwise alternately in opposite directions along first and second creased folds respectively disposed at first and second sides of the web to form a series of normally flat panels of uniform width and united, in alternate succession along respective first and second creased folds, thereafter unfolding and advancing successive panels in an unfolded condition lengthwise of the web into a panel bonding zone, applying adhesive in the panel bonding zone at the second side of the web to one of each pair of panels that are united along a first creased fold, in a band parallel to and spaced from the first creased fold and applying adhesive at the first side of the web to one of each pair of panels that are united along a second creased fold, in a band parallel to and spaced from the second creased fold, and refolding the pair of panels in succession along the associated creased fold into contiguous relation to adhesively bond adjacent panels together along a band spaced from the associated creased fold.

9. The process of claim 8 including applying each adhesive band through a plurality of nozzles spaced apart in a direction lengthwise of the band, and moving the nozzles lengthwise of the band through a distance less than the length of the band.

10. The process of claim 8 including applying each adhesive band through a single nozzle, and moving the nozzles through the length of the band.

11. A process of making a pleated expandable and collapsible multi-cell product for window coverings and the like comprising, providing a web of material accordion folded widthwise and having a series of web panels united in alternate succession along first and second creased folds disposed at respective first and second sides of the web, supporting the accordion folded web in a supply stack with adjacent panels in sidewise abutting relation with the first and second creased folds disposed at respective first and second sides of a generally upright median plane, feeding web panels from an outlet end of the supply stack and advancing successive panels in a downward direction and in an unfolded condition from the outlet end of the supply stack through an adhesive applying zone to an upper end of a refold stack, applying adhesive in the adhesive applying zone to each panel in a band parallel to and spaced from the associated creased fold with a preceding panel a distance greater than one-half the width of the panel, and refolding the web panels having adhesive applied thereto in succession along the associated creased fold with a preceding panel onto the upper end of the refold stack, the band of adhesive being applied at the second side of the web to each panel that is joined along a first creased fold to the preceding web panel and the band of adhesive being applied at the first side of the web to each panel that is joined along a second creased fold to a preceding panel.

12. The process of claim 11 including tensioning a portion of the web intermediate the supply stack and the refold stack during application of adhesive to the web panels, and releasing tension in that portion of the web during refolding of the web panels.

13. The process of claim 11 including applying a lateral force to a portion of the web intermediate the supply stack and the refold stack sufficient to deflect that portion of the web crosswise of said median plane during application of adhesive to the web panels, and releasing the lateral force during refolding of the web panels.

14. A process of making a pleated expandable and collapsible multi-cell product for window coverings and the like comprising, providing a web of material accordion folded widthwise and having a series of web panels united in alternate succession along first and second creased folds disposed at respective first and second sides of the web, supporting a supply of prefolded web in a supply stack having a lower end with the first and second creased folds at first and second sides of a generally upright median plane, extending a section of the web from the lower end of supply stack downwardly in an unfolded condition through a web feed slot between a pair of shuttle blades through an adhesive applying zone to an upper end of a refold stack, moving the shuttle blades crosswise of the median plane at the lower end of the supply stack to position the web feed slot alternately at the first and the second sides of the median plane, applying adhesive in the adhesive applying zone to each web panel in a band parallel to and spaced from its creased fold with a preceding panel a distance greater than one-half the width of a panel, providing a first folding blade adjacent the upper end of the refold stack at the first side of the web and a second folding blade adjacent the upper end of the refold stack at the second side of the web, and moving the folding blades alternately to a panel fold position extending across the inlet end of the refold stack during movement of the shuttle blades crosswise of the median plane, to refold the web panels having adhesive applied thereto in succession along the associated creased fold with a preceding panel onto the inlet end of the refold stack.

15. The process of claim 14 including displacing the unfolded web section intermediate the shuttle blades and the inlet end of the refold stack to the first side of the median plane when the shuttle blades are moved to the first position thereof and to the second side of the median plane when the shuttle blades are moved to the second position thereof, to increase tension in the unfolded section of the web as the shuttle blades move away from the median plane toward the first and second positions thereof, and refolding the web panels when the shuttle blades are intermediate the first and second positions thereof.

16. The process of claim 14 including maintaining one of the panel folding blades in a panel fold position during application of adhesive to the panels.

17. The process of claim 14 wherein adhesive is applied to each panel when it is contiguous to the inlet end of the refold stack and that panel is then refolded onto the inlet end of the refold stack.

18. The process of claim 14 wherein adhesive is applied to a panel contiguous to the inlet end of the stack and to a next succeeding panel and those two panels are then refolded in succession onto the inlet end of the refold stack.

19. A process of making a pleated expandable and collapsible multi-cell product for window coverings and the like comprising, providing a web of material accordion folded widthwise and having a series of web panels united in alternate succession along first and second creased folds disposed at respective first and second sides of the web, supporting a supply of prefolded web in a supply stack having a lower end with the first and second creased folds at first and second sides of a generally upright median plane, extending a section of the web from the lower end of supply stack downwardly in an unfolded condition through a web feed slot between a pair of shuttle blades to an upper end of a refold stack, moving the shuttle blades crosswise of the median plane at the lower end of the supply stack to position the web feed slot alternately at the first and the second sides of the median plane, applying adhesive to each web panel in succession when it is contiguous to the upper end of the refold stack in a band parallel to and spaced from its creased fold with a preceding panel on the upper end of the refold stack a distance greater than one-half the width of the panel, positioning a first folding blade at the first side of the web during application of adhesive at the second side of the web to each panel that is joined along a first creased fold to the preceding panel on the upper end of the refold stack and then moving the first folding blade to a panel fold position extending across the upper end of the refold stack, positioning a second folding blade at its second side of the web during application of adhesive at the first side of the web to each panel joined along a second creased fold to the preceding panel on the upper end of the refold stand and then moving the second folding blade to a panel fold position extending crosswise of the inlet end of the refold stack.

20. A process of making a pleated expandable and collapsible multi-cell product for window coverings and the like comprising, providing a web of material accordion folded widthwise and having a series of web panels united in alternate succession along first and second creased folds disposed at respective first and second sides of the web, supporting a supply of prefolded web in a supply stack having a lower end with the first and second creased folds at first and second sides of a generally upright median plane, extending a section of the web from the lower end of supply stack downwardly in an unfolded condition through a web feed slot between a pair of shuttle blades to an upper end of a refold stack, moving the shuttle blades crosswise of the median plane at the lower end of the supply stack to position the web feed slot alternately at the first and the second sides of the median plane, applying adhesive at the second side of the web to each panel that is united along a first creased fold with a preceding a panel in a band parallel to and spaced from that creased fold, applying adhesive to the first side of the web to each panel that is united along a second creased fold with a preceding panel, in a band parallel to and spaced from that creased fold, providing a first panel folding blade at the first side of the web adjacent the upper end of the refold stack and a second panel folding blade at the second side of the web adjacent the upper end of the refold stack, moving the folding blades alternately to a panel fold position extending across the inlet end of the refold stack during the movement of the shuttle blades crosswise of the median plane to refold web panels having adhesive applied thereto in succession along the associated creased fold with a preceding panel onto the inlet end of the refold stack, the first folding blade being moved out of the panel fold position thereof and the second folding blade being moved into the panel fold position thereof when the web feed slot is positioned at the first side of the median plane, the second folding blade being moved out of the panel fold position thereof and the first panel folding blade being moved into the panel fold position thereof when the web feed slot is positioned at the second side of the median plane.

21. The process of claim 20 wherein adhesive is applied to one panel when the web feed slot is positioned at one side of the median plane and to a succeeding panel when the web feed slot is thereafter moved to a position at the other side of the median plane.

22. The process of claim 20 wherein adhesive is applied to two contiguous panels when the web feed slot is positioned at one side of the median plane.

23. An apparatus for making a pleated expandable and collapsible multi-cell product for window coverings and the like from a web accordion folded widthwise and having a series of web panels of like width united in alternate succession along first and second creased folds respectively disposed at first and second sides of the web, the apparatus comprising, (a) a web supply receiver means for supporting a supply of the web in a folded condition and with the first and second creased folds at first and second sides of a generally upright median plane, the web supply receiver means including a shuttle having a pair of shuttle blades spaced apart to define a web feed slot therebetween; means for moving the shuttle crosswise of the median plane at the lower end of the web supply receiver means to position the web feed slot alternately at first and second sides of the median plane for feeding the web from the receiver means one panel at a time for advance lengthwise of the web in an open condition into a panel bonding zone, (b) refold stack guide means having an upper end spaced below the lower end of the web supply receiver means, (c) a first adhesive applying means in the panel bonding zone below the shuttle and above the upper end of the refold stack guide means at the first side of the web for applying adhesive at the first side of the web to a panel in a band parallel to and spaced from the associated creased fold with a preceding panel, (d) a second adhesive applying means in the panel bonding zone below the shuttle and above the refold stack guide means at the second side of the web for applying adhesive at the second side of the web to a panel in aba nd parallel to and spaced from the associated creased fold with a preceding panel, (e) a first panel folding blade adjacent the upper end of the refold stack guide means at the first side of the web for refolding pairs of panels that are united along a first creased fold, (f) a second panel folding blade adjacent the upper end of the refold stack guide means at the second side of the web for refolding pairs of panels united along a second creased fold, (g) means operating said panel folding blades after adhesive has been applied to the web by said adhesive applying means.

24. An apparatus for making a pleated expandable and collapsible multi-cell product for window coverings and the like from a web accordion folded widthwise and having a series of web panels of like width united in alternate succession along first and second creased folds disposed at respectively first and second sides of the web, the apparatus comprising, means for feeding successive panels in a unfolded condition lengthwise of the web and in a downward direction to the panel bonding station, the panel bonding station including:

(a) refold stack guide means having an upper end, (b) a first panel folding blade at the first side of the web and operable between a first position and a generally horizontal panel fold position extending across the upper end of the refold stack guide means,.

(c) a second panel folding blade at the second side of the web and operable between a first position and a generally horizontal panel fold position extending across the upper end of the refold stack guide means, (d) first adhesive applying means at the first side of the web for applying adhesive at the first side of the web in a horizontal band spaced a first distance above the upper end of the refold stack guide means and extending parallel to the creased folds in the web, (e) a second adhesive applying means at the second side of the web for applying adhesive at the second side of the web in a horizontal band spaced a second distance above the upper end of the refold stack guide means and extending parallel to the creased folds in the web, (f) means operating said first and second panel folding blades alternately to position the first panel folding blade in the first position thereof when the second panel folding blade is in its fold position and to position the second panel folding blade in the first position thereof when the first panel folding blade is in its fold position, and (g) means for operating said adhesive applying means when one of said panel folding blades is in the panel fold position thereof.

25. An apparatus according to claim 24 wherein said means for feeding includes web supply receiver means for supporting a supply of the web in a folded condition with the first and second creased folds at opposite sides of a generally upright plane, the receiver means having a lower outlet and a pair of shuttle blades spaced apart to define a web feed slot therebetween, and means for moving the shuttle crosswise of the median plane at the outlet to feed the web from the receiver means one panel at a time in timed relation with the operation of said first and second panel folding blades.

26. An apparatus according to claim 24 wherein said means for feeding includes a web supply receiver means for supporting a supply of the web in a folded condition and with the first and second creased folds at first and second sides of a generally upright median plane, the web supply receiver means including a shuttle having a pair of shuttle blades spaced apart to define a web feed slot therebetween; means for moving the shuttle crosswise of the median plane to position the web feed slot alternately at first and second sides of the median plane for feeding the web from the receiver means one panel at a time in timed relation with the operation of said first and second panel folding blades.

27. An apparatus according to claim 26 wherein the shuttle is moved to position the slot at the first side of the median plane when the first panel folding blade is moved to the first position thereof and the shuttle is moved to position the slot at the second side of the median plane when the second panel folding blade is moved to the first position thereof.

28. An apparatus according to claim 27 including web tensioning means engageable with the web intermediate the shuttle blades and the web folding blades for displacing the unfolded web to the first side of the median plane when the shuttle blades are moved to the first side of the median plane and for displacing the unfolded web section to the second side of the median plane when the shuttle blades are moved to the second side of the median plane.

29. An apparatus according to claim 24 wherein said means for operating the adhesive applying means is arranged to operate said first adhesive applying means when the second panel folding blade is in its support position and to operate said second adhesive applying means when the first panel folding blade is in its support position.

30. An apparatus according to claim 24 wherein said first and second adhesive applying means each include a single nozzle and means for moving the nozzle widthwise of the web a distance at least equal to the length of the band.

31. An apparatus according to claim 24 wherein said first and second adhesive applying means each include a plurality of nozzles spaced apart in a row, and means for moving said nozzles in a direction lengthwise of the row a distance at least equal to the spacing of the nozzles in the row.

32. An apparatus according to claim 24 wherein the first and second adhesive applying means are spaced apart in a direction to apply adhesive to two adjacent panels, and said means for operating the adhesive applying means is arranged to operate both adhesive applying means at the same time.

33. A process of making a pleated expandable and collapsible multi-cell product for window coverings and the like from a web accordion folded widthwise and having a series of web panels of uniform width united in alternate succession along first and second creased folds disposed at respective first and second sides of the web, the apparatus comprising, web supply receiver means for supporting a supply of the web in a folded condition and with the first and second creased folds at first and second sides of a generally upright median plane, the supply receiver means including a shuttle having a pair of shuttle blades spaced apart to define a web feed slot therebetween, means for moving the shuttle blades crosswise of the median plane to position the web feed slot alternately at first and second sides of the median plane, a first panel folding blade spaced below the shuttle at the first side of the median plane and operable into and out of a generally horizontal panel fold position, a second panel folding blade spaced below the shuttle at the second side of the median plane and operable into and out of a generally horizontal panel fold position, web tensioning means engageable with the web in a zone intermediate the shuttle blades and the web folding blades for displacing the unfolded web section to the first side of the median plane when the shuttle blades are moved to the first side of the median plane and for displacing the unfolded web section to the second side of the median plane when the shuttle blades are moved to the second side of the median plane, a first adhesive applying means at the first side of the median plane for applying adhesive at the first side of the web in a band extending parallel to the creased folds in the web, a second adhesive applying means at the second side of the median plane for applying adhesive to a second side of the web in a band extending parallel to the creased folds in the web, means for operating said first and second panel folding blades alternately.

34. A process of making a pleated expandable and collapsible multi-cell product for window coverings and the like from a web accordion folded widthwise and having a plurality of web panels of uniform width serially united in alternate succession along first and second creased folds disposed at respective first and second sides of the web, the apparatus comprising, web supply receiver means for supporting a supply of the web in a folded condition and with the first and second creased folds at first and second sides of a generally upright median plane, the supply receiver means including a shuttle having a pair of shuttle blades spaced apart to define a web feed slot therebetween, means for moving the shuttle blades crosswise of the median plane to position the web feed slot alternately at first and second sides of the median plane, a first panel folding blade spaced below the shuttle at the first side of the median plane and operable between a generally upright panel support postion and a generally horizonal panel fold position, a second panel folding blade at the second side of the median plane and operable between a generally upright panel support position and a generally horizontal panel fold position, a first adhesive applying means at the first side of the median plane for applying adhesive at the first side of the web in a band extending parallel to the creased folds in the web, a second adhesive applying means at the second side of the median plane for applying adhesive to a second side of the web in a band extending parallel to the creased folds in the web, means for operating said first and second panel folding blades alternately in timed relation with said shuttle to position the first panel folding blade in its support position when the second panel folding blade is in its fold position and to position the second panel folding blade in its support position when the first panel folding blade is in its fold position, and means for operating said second adhesive applying means when the first panel folding blade is in its support position and for operating said first adhesive applying means when the second panel folding blade is in its support position.

35. An apparatus according to claim 34 including web tensioning means engageable with the web intermediate the shuttle blades and the web folding blades for displacing the unfolded web section to the first side of the median plane when the shuttle blades are moved to the first side of the median plane and for displacing the unfolded web section to the second side of the median plane when the shuttle blades are moved to the second side of the median plane.

36. A process of making a pleated expandable and collapsible multi-cell product for window coverings and the like from a web accordion folded widthwise and having a plurality of web panels of uniform width serially united in alternate succession along first and second creased folds disposed at respective first and second sides of the web, the apparatus comprising, web supply receiver means for supporting a supply of the web in a folded condition and with the first and second creased folds at first and second sides of a generally upright median plane, the supply receiver means including a shuttle having a pair of shuttle blades spaced apart to define a web feed slot therebetween, means for moving the shuttle blades crosswise of the median plane to position the web feed slot alternately at first and second sides of the median plane, refold stack guide means having an upper end spaced below the web supply receiver means, a first panel folding blade spaced below the shuttle at the first side of the median plane and movable into and out of a generally horizontal panel fold position extending across the upper end of the refold stack guide means, a second panel folding blade at the second side of the median plane and movable into and out of a generally horizontal panel fold position extending across the upper end of the refold stack guide means, a first adhesive applying means at the first side of the median plane for applying adhesive at the first side of the web in a horizontal band spaced a first distance above the upper end of the refold stack guide means and extending parallel to the creased folds in the web, a second adhesive applying means at the second side of the median plane for applying adhesive to a second side of the web in a horizontal band spaced a second distance above the upper end of the refold stack guide means and extending parallel to the creased folds in the web, means for operating said first and second panel folding blades alternately in timed relation with said shuttle to move first panel folding blade into the fold position thereof when the second panel folding blade is moved out of the fold position thereof and to move the second panel folding blade into the fold position thereof when the first panel folding blade is moved out of the fold position thereof, and means for operating the first and second adhesive applying means when one of the panel folding blades is in the fold position thereof.

37. An apparatus according to claim 36 including web tensioning means engageable with the web intermediate the shuttle blades and the web folding blades for displacing the unfolded web section to the first side of the median plane when the shuttle blades are moved to the first side of the median plane and for displacing the unfolded web section to the second side of the median plane when the shuttle blades are moved to the second side of the median plane.

* * * * *

UNITED STATES PATENT AND TRADEMARK OFFICE

CERTIFICATE OF CORRECTION

PATENT NO. : 5,160,563

DATED : Nov. 3, 1992

INVENTOR(S) : D. J. Kutchmarek et al

It is certified that error appears in the above-identified patent and that said Letters Patent is hereby corrected as shown below:

CLAIM 5, column 11, line 17, change "nozzles" to --nozzle--;

CLAIM 8, column 11, line 32, delete the comma before "alternate"; line 44, change "pair" to -- pairs --;

CLAIM 10, column 11, line 3, change "nozzles" to --nozzle--;

CLAIM 23, column 14, line 67, change "aba" to -- a -- and "nd" to -- band --; column 15, line 7, insert a comma before "for";

CLAIM 24, column 15, line 15, change "like" to -- uniform --; line 19, change "a" to -- an --; line 21, change "the" (first occurrence) to -- a --; line 46, insert -- for -- before "operating";

CLAIM 33, column 16, line 52, change "A process of" to -- An apparatus for --.

Signed and Sealed this

Fifth Day of October, 1993

Attest:

Bruce Lehman

BRUCE LEHMAN

*Attesting Officer*

*Commissioner of Patents and Trademarks*